United States Patent [19]

Wu

[11] Patent Number: 4,967,029

[45] Date of Patent: Oct. 30, 1990

[54] LIQUID LUBRICANTS FROM ALPHA-OLEFIN AND STYRENE COPOLYMERS

[75] Inventor: Margaret M. Wu, Belle Mead, N.J.

[73] Assignee: Mobil Oil Corporation, Fairfax, Va.

[21] Appl. No.: 403,971

[22] Filed: Sep. 7, 1989

[51] Int. Cl.$^5$ ............................................. C10M 107/12
[52] U.S. Cl. ......................................... 585/12; 585/11; 585/19; 585/411; 585/452
[58] Field of Search ................. 585/11, 12, 19, 411, 585/452

[56] References Cited

U.S. PATENT DOCUMENTS

| | | | |
|---|---|---|---|
| 2,383,179 | 8/1945 | Egloff | 585/438 |
| 2,474,881 | 7/1949 | Young et al. | 585/19 |
| 2,500,203 | 3/1950 | Reiff et al. | 585/438 |
| 3,232,913 | 2/1966 | Van Weynbergh et al. | 502/150 |
| 3,321,541 | 5/1967 | Schleimer et al. | 585/19 |
| 3,373,216 | 3/1968 | Tornqvist | 585/438 |
| 3,812,058 | 5/1974 | Nasser, Jr. | 502/256 |
| 3,974,101 | 8/1976 | Witt | 502/237 |
| 4,211,665 | 7/1980 | Pellegrini, Jr. | 252/63 |
| 4,238,343 | 12/1980 | Pellegrini, Jr. | 585/24 |
| 4,504,592 | 3/1985 | van de Leemput et al. | 502/113 |
| 4,547,473 | 10/1985 | Hamilton et al. | 502/113 |
| 4,604,491 | 8/1986 | Dressler et al. | 585/26 |
| 4,681,866 | 7/1987 | McDaniel et al. | 502/154 |
| 4,714,794 | 12/1987 | Yoshida et al. | 585/26 |
| 4,827,064 | 5/1989 | Wu | 585/10 |
| 4,827,073 | 5/1989 | Wu | 585/530 |

FOREIGN PATENT DOCUMENTS 2738476  3/1979  Fed. Rep. of Germany.

*Primary Examiner*—Curtis R. Davis
*Assistant Examiner*—E. D. Irzinski
*Attorney, Agent, or Firm*—Alexander J. McKillop; Charles J. Speciale; Malcolm D. Keen

[57] ABSTRACT

Alpha-olefins such as 1-decene are copolymerized with vinylaromatic monomers, especially styrene or the alkylstyrenes, to produce liquid lubricant oligomers having a broad range of viscosities, high viscosity index(VI), improved thermal stability and additive solubility characteristics. The lubricant oligomers are random copolymers containing recurring units of 1-alkene and vinyl aromatic monomer in mole ratios between 2:1 and 500:1, but preferably between 5:1 and 100:1 and more preferably from about 10:1 to 50:1. The recurring 1-alkene units of the copolymer have a branch ratio of less than 0.19, indicative of a poly 1-alkene segment of the copolymer chain or backbone that is essentially linear. The copolymerization catalyst is a reduced Group VIB metal catalyst on porous support, preferably reduced chromium oxide on a silica support.

18 Claims, No Drawings

LIQUID LUBRICANTS FROM ALPHA-OLEFIN AND STYRENE COPOLYMERS

This invention relates to liquid hydrocarbon lubricant compositions comprising copolymers of alpha-olefins and vinyl aromatic compounds and to their method of preparation. The invention, more particularly, relates to high viscosity index lubricants that exhibit enhanced thermal stability and additive solubility, prepared by the copolymerization of alpha-olefins, or 1-alkenes, and vinyl aromatic monomers using a Group VIB metal on porous support as catalyst.

BACKGROUND OF THE INVENTION

Recently, novel lubricant compositions (referred to in this specification as HVI-PAO) produced by oligomerising alpha-olefins and having high values of viscosity index have been disclosed in U.S. Pat. Nos. 4,827 and 4,827,073, to which reference is made for a description of these compositions and of their preparation. These materials are produced by oligomerising the alpha-olefin starting material in the presence of an oligomerisation catalyst comprising reduced chromium on a silica support specifically, the oligomers are produced by contacting a $C_6$–$C_{20}$ 1-alkene feedstock with reduced valence state chromium oxide catalyst on porous silica support under oligomerizing conditions in an oligomerization zone to produce the desired high viscosity, high viscosity index (VI) liquid hydrocarbon lubricant. These oligomers are distiguished by having branch ratios less than 0.19 and the lubricants have notably low pour points, e.g. pour points below $-15°$ C. Lubricants produced by the process cover the full range of lubricant viscosities and exhibit a remarkably high VI and low pour point even at high viscosity. The as-synthesized HVI-PAO oligomer has olefinic unsaturation associated with the last of the recurring monomer units in the structure.

Notwithstanding their generally superior properties, HVI-PAO lubricants are often formulated with additives to enhance those properties for specific applications. The additives which are more commonly used in lubricants include oxidation inhibitors, rust inhibitors, metal passivators, antiwear agents, extreme pressure additives, pour point depressants, detergent-dispersants, viscosity index improvers, foam inhibitors and the like. This aspect of the lubricant arts is specifically described in Kirk-Othmer "Encyclopedia of Chemical Technology", 3rd edition, Vol. 14, pp.477–526, to which reference is made for a description of such additives. Improvements in lubricant technology have come both from new additive development addressed to deficiencies in lubricant basestocks and new basestocks for inherently better properties.

The inclusion of aromatic compounds in the lubricant mixture is known to improve thermal stability. Alkylated aromatics, particularly alkylated naphthalene, are known in the prior art as lubricant additives for their antiwear properties, thermal and oxidative stability as disclosed in U.S. Pat. Nos. 4,211,665, 4,238,343, 4,604,491 and 4,714,7944. Antiwear properties of alkyl-naphthalene lubricating fluids are presented in Khimiya i Tekhnologiya Topliv i Masel, No. 8, pp. 28–29, August, 1986 and show promise as base stocks for lubricants.

A recurring problem in formulating a new lubricant with an additive package is the compatibility or solubity of the additive package in the lube, for specific components of the package may have only very limited solubility in the aliphatic hydrocarbon lubricant oligomer. This can necessitate the addition of further additives as solubilizing agents for the package, adding to the cost and complexity of the lube blend. Consequently, when the basic structure or backbone of the oligomer can be modified to include functional groups which confer desirable characteristics on the oligomer itself, for example, improved thermal stability or solubilizing characteristics, the foregoing lubricant formulation problems are mitigated.

SUMMARY OF THE INVENTION

We have now developed HVI-PAO compositions which have improved thermal stability and additive solubilizing characteristics and which are extremely useful as liquid lubricants. These lubricants are copolymers or co-oligomers of alpha-olefins and vinyl aromatic monomers.

To make these liquid lubricants, alpha-olefins, especially lower alpha-olefins such as 1-decene are copolymerized or co-oligomerised with vinyl aromatic monomers, especially styrene or the alkyl styrenes such as methyl styrene, to produce liquid lubricant oligomers having a broad range of viscosities and high VI. These oligomers also exhibit improved thermal stability and additive solubilising characteristics. The lubricant oligomers are random copolymers containing recurring units of 1-alkene and vinyl aromatic monomer in mole ratios between 2:1 and 500:1, but preferably between 5:1 and 100:1 and most preferably about 10:1 to 50:1, e.g.20:1. The recurring 1-alkene units of the copolymer are distinguished in that they have a branch ratio of less than 0.19, indicative of a poly 1-alkene segment of the copolymer chain or backbone that is essentially linear.

The catalyst used to prepare these co-oligomers or copolymers comprises is a reduced Group VIB metal catalyst on porous support, i.e. the same catalyst system used in the preparation of the HVI-PAO lubricant oligomers.

In preferred forms, the liquid hydrocarbon lubricant co-oligomers are prepared from $C_6$–$C_{20}$ alpha-olefins and vinyl aromatic compounds by copolymerizing the alpha-olefins and vinyl aromatic compounds with a Group VIB metal catalyst on a porous support, with the catalyst being prepared by oxidation at a temperature of 200° C. to 900° C. in the presence of an oxidizing gas and then by treatment with a reducing agent at a temperature and for a time sufficient to reduce the metal component of the catalyst to a lower valence state. The preferred catalyst comprises reduced chromium oxide on a silica support.

The liquid hydrocarbon lubricant compositions comprise a random copolymer of $C_6$–$C_{20}$ alpha-olefin monomer and vinyl aromatic monomer, wherein the vinyl aromatic monomer has the formula $CH_2=CH-R$ where R is a mono or dinuclear arylene radical, substituted or unsubstituted, containing 6 to 20 carbon atoms.

DETAILED DESCRIPTION OF THE INVENTION

In the present invention $C_6$–$C_{20}$ alpha-olefins, or mixtures thereof, are copolymerized with vinyl aromatic monomers to produce a novel copolymer. Structurally, the copolymer comprises an addition polymer of random monomer distribution having the polymeric formula:

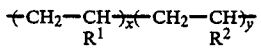
(I).

where $R^1$ is an alkyl group containing four to eighteen carbon atoms and $R^2$ is an aromatic group comprising a substituted or unsubstituted arylene radical having six to eighteen carbon atoms. The copolymer has a ratio of x to y, or mole ratio of different monomer moieties, between 5:1 and 100:1, but preferably from about 10:1 to 50:1.

The copolymer (I) of the instant invention is distinguished over prior art copolymers of vinyl aromatic monomers and $C_6$-$C_{20}$ alpha-olefins in that the copolymer is essentially linear. More particularly, the segment of the copolymeric backbone comprising recurring units of alpha-olefin has little isomerization or methyl group branching as a result of the unique catalyst system used in the process. The branch ratio, or ratio of methyl to methylene group determined as described hereinafter, is less than 0.19. Consequently, lubricant grade oligomers of (I), having an essentially linear structure, exhibit an exceptionally high viscosity index. Prior art copolymers of alpha-olefins and vinyl aromatic compounds, to the extent that they contain the high mole fraction of alpha-olefin required to produce a useful liquid lubricant, contain isomerized groups in the backbone of the copolymer which produces high branch ratios and lower values of viscosity index.

Vinyl aromatic monomers useful in the present invention have the formula $CH_2=CH-R$ where R is a mono or dinuclear arylene radical, substituted or unsubstituted, containing 6 to 20 carbon atoms. Examples of vinyl aromatic compounds include styrene, alkyl styrenes such as methyl styrene, ethyl styrene, n-propyl styrene, isopropyl styrene, n-butyl styrene, tert-butyl styrene, and other vinyl aromatic compounds such as vinyl biphenyl, 1-vinyl naphthalene, 2-vinyl naphthalene, vinyl-methyl naphthalene, vinyl-n-hexyl naphthalene. In the case of the alkyl styrenes, it has been found that both the 3- and 4-alkyl-substituted styrenes will effectively copolymerise with the alpha-olefins.

Olefins suitable for use as comonomers with vinyl aromatic compounds in the preparation of the copolymers of the present invention include those olefins containing from 2 to about 20 carbon atoms such as ethylene, propylene, 1-butene, 1-pentene, 1-hexene, 1-octene, 1-decene, 1-dodecene and 1-tetradecene and branched chain isomers such as 4-methyl-1-pentene. Also suitable for use are olefin-containing refinery feedstocks or effluents. However, the olefins used in this invention are preferably alpha-olefinic as for example $C_6$-$C_{20}$ alpha-olefins including 1-hexene to 1-hexadecene and more preferably 1-octene to 1-tetradecene, or mixtures of such olefins.

The weight ratio of the alpha-olefin to the vinylaromatic compound is generally in the range of about 99:1 to 2:1, preferably from about 50:1 to about 10:1.

The catalyst employed for the preparation of the present co-oligomers or copolymers is a catalyst which is capable of the oligomerizing alpha-olefins without a significant degree of isomerization to produce the high viscosity index liquid lubricants referred to above as HVI-PAO lubricants. Copolymerization of the alpha-olefins with the vinylaromatic compounds in the presence of the reduced chromium oxide catalysts leads to a unique copolymer or co-oligomer which is substantially free of double bond isomerization. Conventional alpha-olefin oligomerization, on the other hand, promoted by $BF_3$ or $AlCl_3$ forms a carbonium ion which, in turn, promotes isomerization of the olefinic bond and the formation of multiple isomers. In the present invention the unique catalyst produces a liquid hydrocarbon lubricant copolymer with branching ratios less than 0.19.

The branch ratios defined as the ratios of $CH_3$ groups to $CH_2$ groups in the lube oil are calculated from the weight fractions of methyl groups obtained by infrared methods, published in *Analytical Chemistry*, Vol. 25, No. 10, p. 1466 (1953).

$$\text{Branch ratio} = \frac{\text{wt fraction of methyl group}}{1 - (\text{wt fraction of methyl group})}$$

The co-monomers used in the process of the present invention are co-oligomerized or co-polymerised by supported metal oxide catalysts, such as Cr compounds on silica or other supported IUPAC Periodic Table Group VIB compounds. The catalyst most preferred is a lower valence Group VIB metal oxide on an inert support. Preferred supports include silica, alumina, titania, silica alumina, magnesia aluminum phosphate and the like. The support material binds the metal oxide catalyst. Those porous substrates having a pore opening of at least 40 A°. are preferred.

The support material usually has high surface area and large pore volumes with average pore size of 40 to about 350 angstroms. The high surface area are beneficial for supporting large amount of highly dispersive, active chromium metal centers and to give maximum efficiency of metal usage, resulting in very high activity catalyst. The support should have large average pore openings of at least 40 A°, with an average pore opening of ≠60 to 300 A° preferred. This large pore opening will not impose any diffusional restriction of the reactant and product to and away from the active catalytic metal centers, thus further optimizing the catalyst productivity. Also, for this catalyst to be used in fixed bed or slurry reactor and to be recycled and regenerated many times, a silica support with good physical strength is preferred to prevent catalyst particle attrition or disintegration during handling or reaction.

The supported metal oxide catalyst-..s are preferably prepared by impregnating metal salts in water or organic solvents onto the support. Any suitable organic solvent known to the art may be used, for example, ethanol, methanol, or acetic acid. The solid catalyst precursor is then dried and calcined at 200 to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$, metal alkyl containing compounds such as $R_3Al$, $R_3B$, $R_2Mg$, $RLi$, $R_2Zn$, where R is alkyl, alkoxy, aryl and the like. Preferred are CO or $H_2$ or metal alkyl containing compounds. Alternatively, the Group VIB metal may be applied to the substrate in reduced form, such as CrII compounds. The resultant catalyst is very active for copolymerizing alpha-olefins and vinyl aromatic monomers olefins at a temperature range from below room temperature, eg. as low as −10° C., to about 250° C. at a pressure of 0.1 atmosphere to 5000 psi. A temperature of 25° C. to 250° C. is preferred. Contact time of the comonomers and the catalyst can vary from one second to 24 hours. The catalyst can be used in a batch type reactor or in a fixed bed, continuous-flow reactor.

In general the support material may be added to a solution of the metal compounds, e.g., acetates or nitrates, etc., and the mixture is then mixed and dried at room temperature. The dry solid gel is purged at successively higher temperatures to about 600° C. for a period of about 16 to 20 hours. Thereafter the catalyst is cooled down under an inert atmosphere to a temperature of about 250 to 450° C. and a stream of pure reducing agent is contacted therewith for a period when enough CO has passed through to reduce the catalyst as indicated by a distinct color change from bright orange to pale blue. Typically, the catalyst is treated with an amount of CO equivalent to a two-fold stoichiometric excess to reduce the catalyst to a lower valence CrII state. Finally the catalyst is cooled down to room temperature and is ready for use.

Examples 1 and 2 below provide an illustration of the preparation of the catalyst used in the present process.

EXAMPLE 1

Catalyst Preparation and Activation Procedure 1.9 grams of chromium (II) acetate ($Cr_2(OCOCH_3)_4 2H_2O$)(5.58 mmole) (commercially obtained) is dissolved in 50 cc of hot acetic acid. Then 50 grams of a silica gel of 8-12 mesh size, a surface area of 300 $m^2/g$, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with $N_2$ at 250° C. in a tube furnace. The furnace temperature is then raised to 400° C. for 2 hours. The temperature is then set at 600° C. with dry air purging for 16 hours. At this time the catalyst is cooled down under N to a temperature of 300° C. Then a stream of pure CO (99.99% from Matheson) is introduced for one hour. Finally, the catalyst is cooled down to room temperature under $N_2$ and ready for use.

EXAMPLE 2

A commercial Cr on silica catalyst which contains 1% Cr on a large pore volume synthetic silica gel is used. The catalyst is first calcined with air at 700° C. for 16 hours and reduced with CO at 350° C. for one to two hours.

In carrying out the copolymerization, conditions can be selected to provide a wide range of viscosities for the liquid lubricant produced. Reactions carried out at high temperatures produce oligomers with low viscosities while lower temperature oligomerization reactions produce higher viscosity product. In either case the product is distinguished by high viscosity index. Viscosity indices of at least 130 are achieved, ranging up to 280. Viscosities range from 15cS to 750 cS, measured at 100° C.

The ratio of alpha-olefin to vinyl aromatic monomer in the copolymerization reaction mixture is selected by considerations of thermal stability and solubilizing character to be incorporated into the HVI-PAO structure. Generally, relatively small amounts of vinyl aromatic are sufficient to significantly improve thermal stability compared to a HVI-PAO lubricant control. However, the product of this invention can contain between 0.5 and 25 weight percent of the vinyl aromatic moiety, but preferably about 2-10 weight percent.

The copolymerization step is suitably carried out by mixing the monomers with a small amount of catalyst, generally about 1-5 weight percent, and heating the reaction mixture in an inert atmosphere. Typical reaction temperatures are 120-130° C. and reaction times are 1-36 hours. The catalyst is removed and the reaction mixture product separated to remove unreacted components. Conventional distillation or similar means are effective in product separation. The liquid lubricant is recovered in high yield. The product is then hydrogenated by means well known in the art, such as over nickel catalyst on kieselguhr, to provide a liquid hYdrocarbon lubricant of high thermal stability and high viscosity index. The conditions applicable to the preparation of the copolymer are the same as those described herein for the preparation of HVI-PAO. Generally, the reaction is carried out in solution with catalyst in suspension in a stirred reactor. However, a fixed bed reactor can also be employed. The product copolymer also exhibits a low pour point of less than −15° C.

EXAMPLE 3-7

In Examples 3-6 the present copolymerization process and copolymer products are illustrated and compared with a HVI-PAO homopolymer control, Example 7, prepared under the same conditions.

The catalyst used in all Examples is prepared as described in Example 2. The copolymerization reaction is carried out as follows: a solution of 100 grams containing styrene in 1-decene is mixed with 5 grams of catalyst and heated to 130° C. under nitrogen atmosphere. After 16 hours the catalyst is filtered and the liquid recovered is distilled under vacuum. Hydrogenation of the recovered liquid is carried out using hydrogen and nickel catalyst on kieselguhr. Results are presented in Table 1.

TABLE 1

| Expl. No. | Wt % Monomer | | Lube yield wt % | Hydrogenated Product | | | |
|---|---|---|---|---|---|---|---|
| | Styrene | 1-decene | | Viscosity, cS | | VI | Pour Pt. |
| | | | | @ 40° C. | @ 100° C. | | |
| 3 | 1 | 99 | 94.1 | 355.3 | 43.2 | 177 | −47° C. |
| 4 | 3 | 97 | 96.1 | 1019.9 | 100.6 | 190 | −39°C. |
| 5 | 4 | 96 | | 1253.5 | 110.4 | 183 | |
| 6 | 8 | 92 | 37 | 3164 | 206.6 | 185 | −24°C. |
| 7 | 0 | 100 | 94 | 1420 | 140 | 214 | −40°C. |

The products from the control Example 7, when tested for thermal stability in comparison with the copolymers prepared in Examples 4 and 5, showed the results presented in Table 2. The thermal stability tests were carried out at a temperature of 280° C. under nitrogen atmosphere for 24 hours.

The thermal stability test results clearly show the superior performance of the copolymer of the present invention over the HVI-PAO homopolymer, attributable to the inclusion of a relatively small amount of aromatic component in the backbone of the polymer composition.

TABLE 2

| Expl. No. | Initial VcS @ 100° C. | VI | After Cracking @ 280° C. VcS @ 100 | VI | % VcS @ 100° C. loss |
|---|---|---|---|---|---|
| 4 | 100.6 | 190 | 59.8 | 181 | 40 |
| 5 | 110.4 | 183 | 63.7 | 174 | 42 |
| 7 | 145 | 212 | 50.75 | | 65 |

What is claimed is:

1. A process for the production of liquid hydrocarbon lubricant having enhanced thermal stability from $C_6$-$C_{20}$ alpha-olefins and vinyl aromatic compounds, comprising;

copolymerizing said alpha-olefins and vinyl aromatic compounds with chromium catalyst on a porous support, which catalyst has been treated by oxidation at a temperature of 200° C. to 900° C. in the presence of an oxidizing gas and then by treatment with a reducing agent at a temperature and for a time sufficient to reduce said catalyst to a lower valence state.

2. The process of claim 1 wherein said alpha-olefins and vinyl aromatic compounds are copolymerized at a temperature between about 90° C. and 250 ° C.

3. The process of claim 1 wherein the weight ratio of said alpha-olefins to said vinyl aromatic compounds is between 99:1 and 2:1.

4. The process of claim 3 wherein said weight ratio is between 50:1 and 10:1.

5. The process of claim 1 wherein said reducing agent comprises CO, the copolymerization temperature is about 100–180° C. to obtain $C_{30}$+liquid lubricant copolymer having a viscosity of at least 15cS at 100° C. and a viscosity index of at least 130.

6. The process of claim 1 wherein the alpha-olefin consists essentially of 1-octene, 1-decene, 1-dodecene, 1-tetradecene or mixtures thereof.

7. The process of claim 1 wherein the alpha-olefin consists essentially of 1-decene.

8. The process of claim 1 wherein the vinyl aromatic compounds have the formula $CH_2=CH-R$ where R is a mono or dinuclear arylene radical, substituted or unsubstituted, containing 6 to 20 carbon atoms.

9. The process of claim 8 wherein said vinyl aromatic compound comprises styrene.

10. The process of claim 1 wherein the vinyl aromatic compound comprises styrene and the alpha-olefin comprises 1-decene.

11. The process of claim 1 wherein said liquid hydrocarbon lubricant has a pour point below −15° C., viscosity index of about 130 to 280 and viscosity up to about 750 cS at 100° C.

12. A liquid hydrocarbon lubricant composition having enhanced thermal stability comprising a random coplymer of $C_6$-$C_{20}$ alpha-olefin monomer and vinyl aromatic monomer, said composition having a pour point below −15° C., viscosity index of about 130 to 280 and viscosity up to about 750 cS at 100° C; wherein said aromatic monomer comprises less than twenty weight percent of said composition; and wherein the recurring units of said alpha-olefin monomer have a branch ratio of less than 0.19.

13. The composition of claim 12 wherein the vinyl aromatic monomer has the formula $CH_2=CH-R$ where R is a mono or dinuclear arylene radical, substituted or unsubstituted, containing 6 to 20 carbon atoms; and wherein the alpha-olefin consists essentially of 1-octene, 1-decene, 1-dodecene, 1-tetradecene or mixtures thereof.

14. The composition of claim 12 wherein the vinyl aromatic compound comprises styrene and the alpha-olefin comprises 1-decene.

15. A liquid hydrocarbon lubricant comprising the copolymerization product of $C_6$-$C_{20}$ alpha-olefins and vinyl aromatic compounds with chromium catalyst on porous support, which catalyst has been treated by oxidation at a temperature of 200° C. to 900° C. in the presence of an oxidizing gas and then by treatment with a reducing agent at a temperature and for a time sufficient to reduce said catalyst to a lower valence state.

16. The lubricant according to claim 15 wherein said reducing agent comprises CO, the copolymerization temperature is about 90–250° C. to produce $C_{30}$+ liquid lubricant copolymer having a viscosity of at least 15cS at 100° C. and a viscosity index of at least 130.

17. The lubricant of claim 15 wherein the vinyl aromatic compound has the formula $CH_2=CH-R$ where R is a mono or dinuclear arylene radical, substituted or unsubstituted, containing 6 to 20 carbon atoms; and wherein the alpha-olefin consists essentially of 1-octene, 1-decene, 1-dodecene, 1-tetradecene or mixtures thereof.

18. The lubricant of claim 15 wherein the vinyl aromatic compound comprises styrene and the alpha-olefin comprises 1-decene.

* * * * *